(12) United States Patent
Cheng (10) Patent No.: US 8,102,423 B2
(45) Date of Patent: Jan. 24, 2012

(54) METHOD AND SYSTEM FOR PERFORMING ADAPTIVE IMAGE ACQUISITION

(75) Inventor: Hui Cheng, Bridgewater, NJ (US)

(73) Assignee: SRI International, Menlo Park, CA (US)

( * ) Notice: Subject to any disclaimer, the term of this patent is extended or adjusted under 35 U.S.C. 154(b) by 1920 days.

(21) Appl. No.: 11/200,869

(22) Filed: Aug. 10, 2005

(65) Prior Publication Data

US 2006/0077255 A1    Apr. 13, 2006

Related U.S. Application Data

(60) Provisional application No. 60/600,277, filed on Aug. 10, 2004, provisional application No. 60/600,278, filed on Aug. 10, 2004.

(51) Int. Cl.
*H04N 7/18* (2006.01)

(52) U.S. Cl. .................. 348/159; 348/143

(58) Field of Classification Search ............. 348/36–39, 348/42–60, 143–160
See application file for complete search history.

(56) References Cited

U.S. PATENT DOCUMENTS

| | | | |
|---|---|---|---|
| 4,949,391 A | 8/1990 | Faulkerson et al. | |
| 5,341,181 A | 8/1994 | Godard | |
| 7,486,324 B2 * | 2/2009 | Driscoll et al. | 348/335 |

\* cited by examiner

*Primary Examiner* — Andy Rao

(74) *Attorney, Agent, or Firm* — Moser Taboada (57) ABSTRACT

An adaptive image acquisition system and method that generates virtual view of a surveillance scene to a user (operator), in which, the user operates the system. Through viewing the virtual view, the user controls sensors that create the virtual view. The sensors comprise at least one first sensor having a higher resolution than at least one second sensor. Images from the second sensor are processed to create an image mosaic that is overlaid with images from the higher resolution first sensor. In one embodiment of the invention, the first sensor is moved using Saccade motion. In another embodiment of the invention, a user's intent is used to control the Saccade motion.

8 Claims, 8 Drawing Sheets

METHOD AND SYSTEM FOR PERFORMING ADAPTIVE IMAGE ACQUISITION

CROSS-REFERENCE TO RELATED APPLICATIONS

This application claims benefit of U.S. provisional patent application Ser. No. 60/600,277, filed Aug. 10, 2004, and 60/600,278, filed Aug. 10, 2004, which are both herein incorporated by reference.

GOVERNMENT RIGHTS IN THIS INVENTION

This invention was made with U.S. government support under contract numbers HM1582-04-P-001 and HM1582-04-C-0010. The U.S. government has certain rights in this invention.

BACKGROUND OF THE INVENTION

1. Field of the Invention

Embodiments of the present invention generally relate to image acquisition system and, more particularly, to adaptive image acquisition systems.

2. Description of the Related Art

Unmanned aerial vehicles (UAVs) are widely used as platforms for surveillance in battlefield and other environments. Generally, a UAV carries a camera and other sensor payloads and relays data collected by the sensor payloads through a radio link to an operator. The operator controls the flight path of the UAV and the view captured by the payloads from a remote location via a radio link to the UAV. The operator uses images from the camera to guide the UAV over the area to be monitored.

To achieve persistent surveillance using UAVs with current technology requires too many UAVs and operators to cover even a limited coverage area. For example, given a surveillance area of 3 sq-km, persistent surveillance requires 30 UAVs (Surveillance Area/Sensor Area Coverage=3.0/0.10) to identify vehicle type or track vehicles within the area. If the task is to have precise monitoring (i.e., ID vehicles and detect people) it would require 225 UAVs (3.0/0.016=225). Obviously, this is not a viable solution. What happens today is that either an operator concentrates on a single target (and therefore misses other intelligence opportunities) or the operator scans over the entire region. Such re-scanning causes a delayed target revisit period, e.g., as much as 20 minutes.

Direct-operator-control of imaging sensors, such as cameras, significantly limits the capabilities of an imaging system. Since a human needs time to perceive and understand the content of an image or a video sequence, the imaging system is operated at a speed much less than of the capability of the system. For example, even if a camera can take 30 pictures of 30 different places in one second, the camera operator can not understand them, let alone control a camera to take 30 pictures of 30 different places.

Because of these limitations, current UAVs monitor large areas but with very low update rates for regions that they are not being immediately imaged, and for the targets that are being imaged, the update rate is typically much too high (30-60 times a second). Almost all of the information is redundant and adds little or no intelligence value. Additionally, intelligence opportunities often occur in a bursty manner. Long periods generally exist between consecutive events. This can cause a significant decrease in operators' attention and thereby increase the chance of missed targets and events.

Similarly, image analysts face a sea of imagery data, most of which have little intelligence value. Searching, exploiting and navigating through the vast amount of data by analysts are both inefficient and error-prone. It will also increase the response time and cause unnecessary delay.

In addition, the total video bandwidth to cover the entire region simultaneously would be prohibitive. Each compressed video sensor would require at least 7 Mbits/sec. A total coverage would therefore require 7×225=1,575 Mbits/sec. This would overwhelm any available communications link.

To achieve wide area persistent surveillance, motion-imagery acquisition systems operate under severe constraints: limited bandwidth for communication, continuous operation over long periods, and unpredictable changes of tasks and environment. Thus, it is desirable that image acquisition be self-adaptive and fully automated, facilitating continuous capture of all events and monitoring of all targets by providing persistent surveillance of a large area at both high spatial and temporal resolution. In addition, intelligence has to be extracted from the huge amount of data acquired by a persistent surveillance system with low latency.

Therefore, there is a need in the art for a persistent surveillance technique that overcomes the deficiencies of the prior art.

SUMMARY OF THE INVENTION

The present invention is an adaptive image acquisition system and method that generates virtual view of a surveillance scene to a user (operator), in which, the user operates the system. Through viewing the virtual view, the user controls at least one sensor that creates the virtual view. The at least one sensor creates higher resolution images and lower resolution images. The lower resolution images are processed to create an image mosaic that is overlaid with the higher resolution images. In one embodiment of the invention, the higher resolution images are created by a first sensor that is moved using Saccade motion. In another embodiment of the invention, a user's intent is used to control the Saccade motion.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

To achieve persistent surveillance using an unmanned aerial vehicle (UAV), the following three capabilities are necessary: 1) sensor systems must be operated to their maximum information collection efficiency, 2) a single operator must be able to control or guide multiple collection platforms, and 3) analysts must be able to extract in real-time or near real-time the information needed for their task, without the burden of controlling the sensor payload or the burden of searching through vast amounts of irrelevant data.

The present invention significantly improves the overall surveillance capabilities of UAVs by allowing the UAV to operate to its maximum collection capability by replacing direct control of the UAV by an operator and, instead, giving the operator indirect control. The technique is referred to as SaccadeCam—it is biologically inspired by the Saccade behavior of the human visual system of very high speed and frequent changes in the visual fixation point.

The most visual acuity and color perception of the human visual system comes from a small area, 4 degrees in diameter, in the center of the retina called the fovea. The periphery, which provides the peripheral vision, has low spatial but high temporal sensitivity. However, the peripheral is 120 degrees in diameter. Despite the fact that humans can clearly see only a very small area, the world as perceived is clear and sharp. This is the result of what is called Saccade motion, the involuntary eye motion that provides humans with approximately 80 degree clear views, 20×20 times the area covered by the fovea. By fast eye movement, humans build a virtual view of the world that is not only large, but also is clear and sharp. Then, guided by motion and change perceived by peripheral vision, only those places that have changed are looked at and updated. Even when there is no motion or change, human eyes still constantly move from one object to another to collect details of those areas and maintain their virtual views. The Saccade motion of human eyes inspired the techniques used in the adaptive image acquisition system of the present invention.

Figure 1:
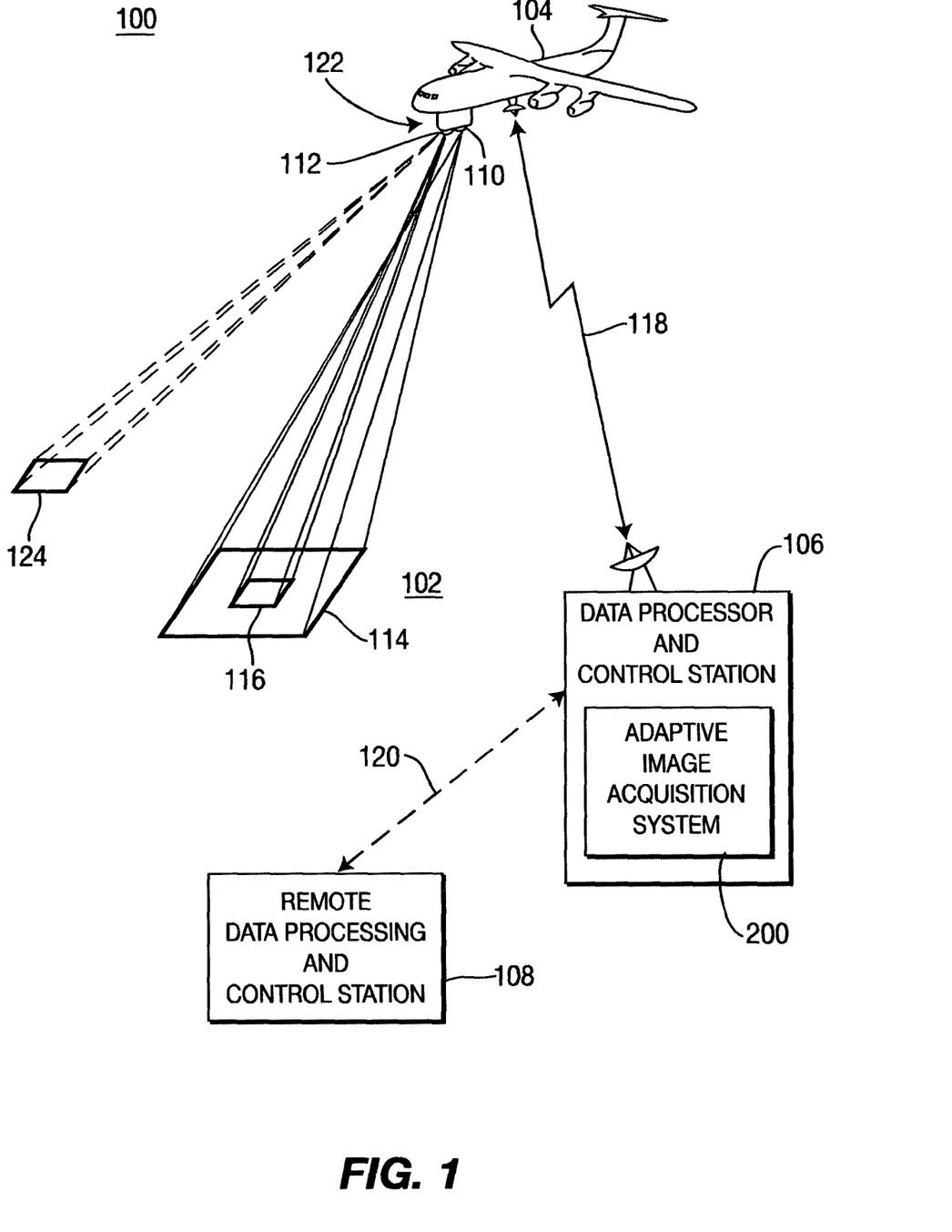
FIG. 1 depicts a high level block diagram of a persistent aerial surveillance system that benefits from one embodiment of the invention.

FIG. 1 depicts a persistent surveillance system 100 that forms one application for the adaptive image acquisition system of the present invention. The persistent surveillance system 100 comprises a UAV 104 and a data processing and control station 106. The UAV 104 comprises a sensor payload 122. The control station 106 controls the flight path of the UAV and the sensor payload 122 through a radio link 118.

In one embodiment of the invention, the payload 122 comprises at least two cameras 110 and 112. The cameras, in accordance with the invention, are a low resolution, wide field-of-view (WFOV) camera 110 imaging area 114 and a high resolution, narrow FOV (NFOV) camera 112 imaging various areas 116 and 124 using a Saccade motion technique that is described in detail below. An adaptive image acquisition system 200 controls the cameras and processes the images that the cameras in accordance with the present invention. Through commands to a motorized gimbal support, the control station 106 independently controls the view that is imaged by each camera 110 and 112. The surveillance system 100 may contain one or more remote data processing and control stations 108 that are coupled to the local control station 106 via a data link 120, e.g., a TCP/IP type network.

In an alternative embodiment of the invention, the payload 122 comprises one camera that produces WFOV and NFOV images. This function can be accomplished using a zoom function to create a WFOV image when the camera "zoomed out" and create a NFOV image when the camera is "zoomed in". Furthermore, a high resolution camera can be used to produce a high resolution image for use as the NFV images. The images can be sub-sampled to create lower resolution images to produce lower resolution WFOV images.

Figure 2:
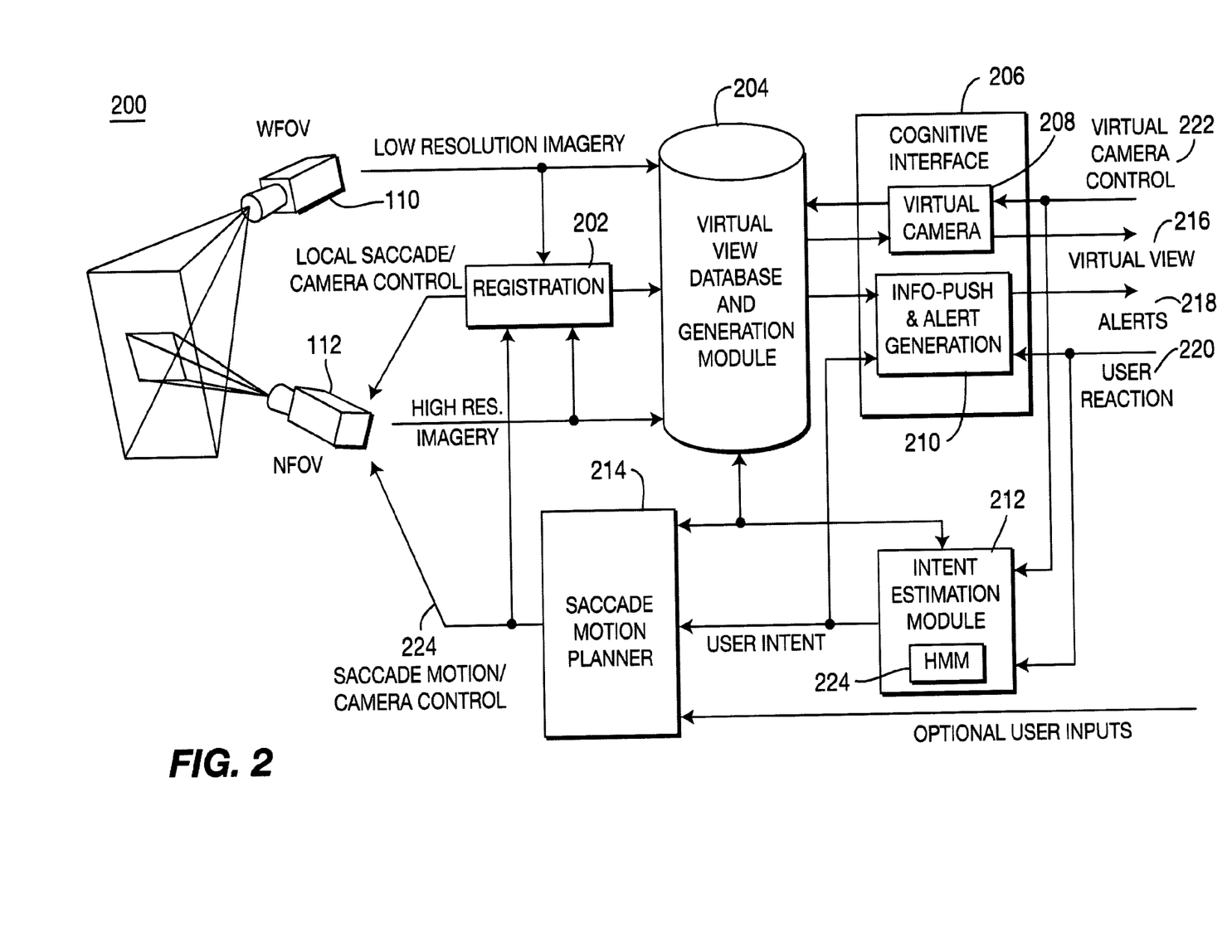
FIG. 2 depicts a block diagram of an adaptive image acquisition system that forms a component of a control station of the persistent aerial surveillance system of FIG. 1.

The "fixation" of the field-of-view (FOV) of the surveillance system 100 constantly "jumps" from one location 116 to another 124. The adaptive image acquisition system 200 determines this simulated Saccade motion, i.e., what, where and when to look, automatically by analyzing previously acquired imagery and/or other available sensor information, such as the output from the low resolution, wide field-of-view (WFOV) camera 110. The following disclosure mainly discusses an embodiment of the invention that uses a two-camera implementation in which the NFOV camera 110 is cued by the output of the WFOV camera 112. However, other sensors could be used to cue the NFOV camera. Also, as mentioned above, a single camera may be used to produce both NFOV and WFOV images.

Figure 13:
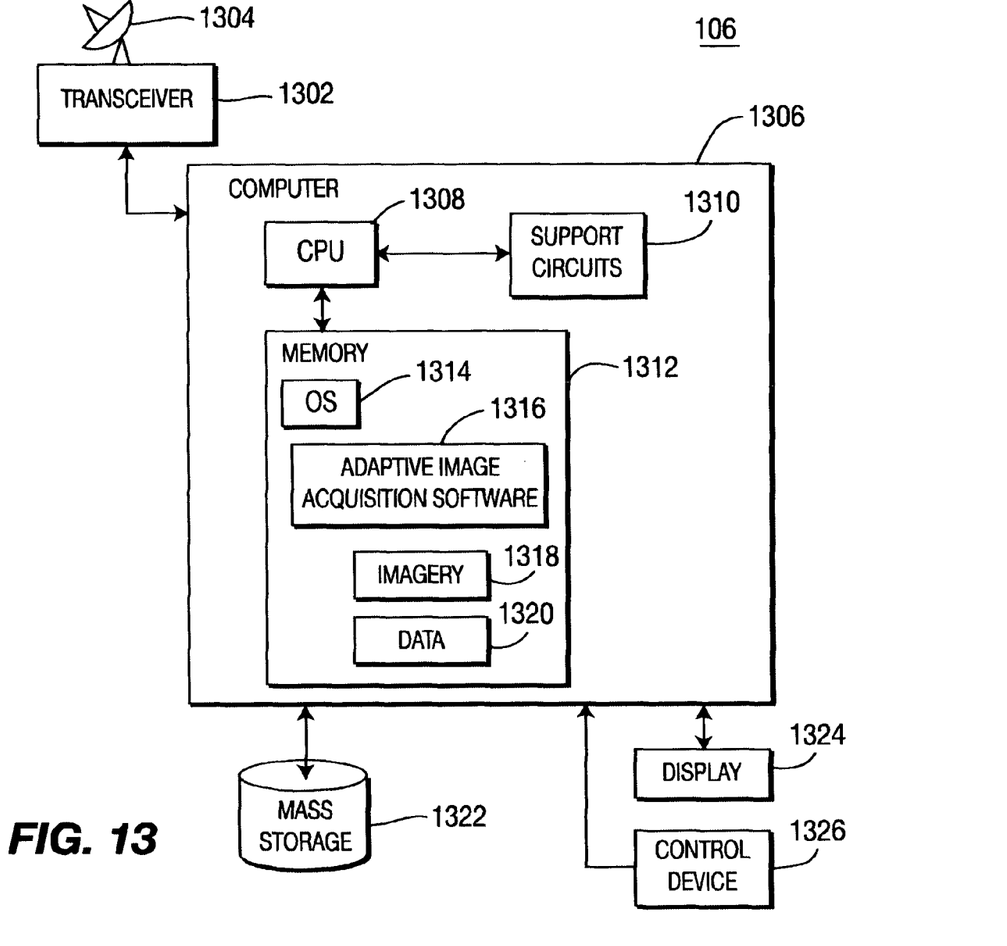
FIG. 13 depicts a block diagram of one embodiment of the hardware of the data processing and control station of FIG. 1.

FIG. 13 depicts a block diagram of the hardware used to implement the control station 106. The station 106 comprises an antenna 1304, a transceiver 1302, a computer 1306, mass storage 1322, a user display 1324 and a user control device 1326. The antenna 1304 and transceiver 1302 are used to send and receive command and control information to the UAV as well as receive images from the sensors. The images are coupled to one or more computers (only one of which is shown). In other embodiments of the invention, the operation of computer 1306 may be embodied in a number of computers that are interconnected via a network.

The computer 1306 comprises a central processing unit (CPU) 1308, support circuits 1310, and memory 1312. The CPU 1308 may be one or more available microprocessors and/or microcontrollers. The support circuits 1310 support the operation of the CPU 1308 and comprises well-known circuits such as cache, power supplies, clock circuits, input/output circuits, and the like. The memory 1312 may comprise random access memory, read only memory, optical memory, removable storage, disk drives, combinations of these memory devices, and the like. The memory 1312 comprises an operating system 1314, an adaptive image acquisition software 1316, imagery 1318 and data 1320. The operating system is a general purpose computer operating system such as LINUX, WINDOWS, SOLARIS and the like. The imagery 1318 and data 1320 are used by the adaptive image acquisition software 1316 as described below. When executed, the adaptive image acquisition software causes the computer 1306 to operate as an adaptive image acquisition system as discussed in detail below. The computer may be coupled to a mass storage device 1322 for image and information storage.

Also, a user display 1324 and a user control device 1326 are used to respectively display imagery to the user and control the camera views.

FIG. 2 depicts block diagram of an adaptive image acquisition system 200 that forms a component of the control station 106 (or 108). The system 200 comprises a registration module 202, a virtual view database 204, a cognitive interface 206, and intent estimation module 212 and a Saccade motion planner 214. The system 200 processes the imagery from the cameras 110 and 112 to produce a virtual view 216 for an operator. As is discussed below, the virtual view is a geo-registered, temporal image mosaic of the area under surveillance. The operator provides virtual camera control 222 based on the virtual view 216. This virtual control is mapped to an actual control signal to the NFOV camera 112. The system 200 also provides alerts to an operator based upon predefined criteria that are applied to the imagery. The operator's reactions 220 to the virtual view are monitored such that the operator's intent can be derived such that the NFOV camera can image objects in the video, using Saccade motion, that "might" be of interest to the operator and process those images without displaying them to the operator. If an object that is imaged in this manner is deemed to be of interest, an alert may be generated.

To create and update the virtual view with both low-resolution WFOV imagery and high-resolution NFOV imagery, the system 200 registers the captured imagery to the image mosaic of the virtual view. Since the WFOV images are captured at a high frame rate, they are easily registered to the low-resolution virtual view using well-known image registration techniques such as described in commonly assigned U.S. Pat. No. 6,075,905, issued Jun. 13, 2005, which is incorporated herein by reference. Similarly, a decimated high-resolution NFOV image can be registered to the low-resolution WFOV image that is used to update the virtual view. Since, for most platforms, both the camera and the platform are moving, the image acquired by the NFOV camera may not be exactly what the Saccade motion specifies. During the registration process, what is acquired by the NFOV camera is compared with what is requested by the Saccade motion planner. If the NFOV image is not what is needed, the NFOV camera takes more pictures with local adjustment, much like the local Saccade in a human vision.

If satellite imagery and terrain elevation data are available, the virtual view will be mapped to the terrain using geo-registration techniques such as is disclosed in commonly assigned U.S. Pat. No. 6,587,601, issued Jul. 1, 2003, which is incorporated herein by reference.

The virtual view database and generation module 204 creates and contains a geo-registered temporal image mosaic of the area under surveillance. At its base layer is the low-spatial/high temporal resolution view of the area generated by the UAV's WFOV camera 110 (i.e., the WFOV camera's output is formed into a mosaic to show the entire sensor coverage area). Into this low-spatial resolution mosaic the high spatial/low temporal resolution output of the NFOV camera 112 is layered. This camera 112 performs Saccade-type motion that fills in the mosaic with more detail as the UAV lingers over the surveillance area.

The Saccade motion of the camera 112 enables a more relevant view of the area since the update rate for a specific object depends on its behavior. Moving objects often are sensed at high resolution, whereas stationary objects are not. The entire area is sensed at low spatial resolution by the WFOV camera 110. This information is used to identify motion or other areas of interest and used to influence (i.e., cue) the behavior of the high-resolution camera 112.

Figure 12:
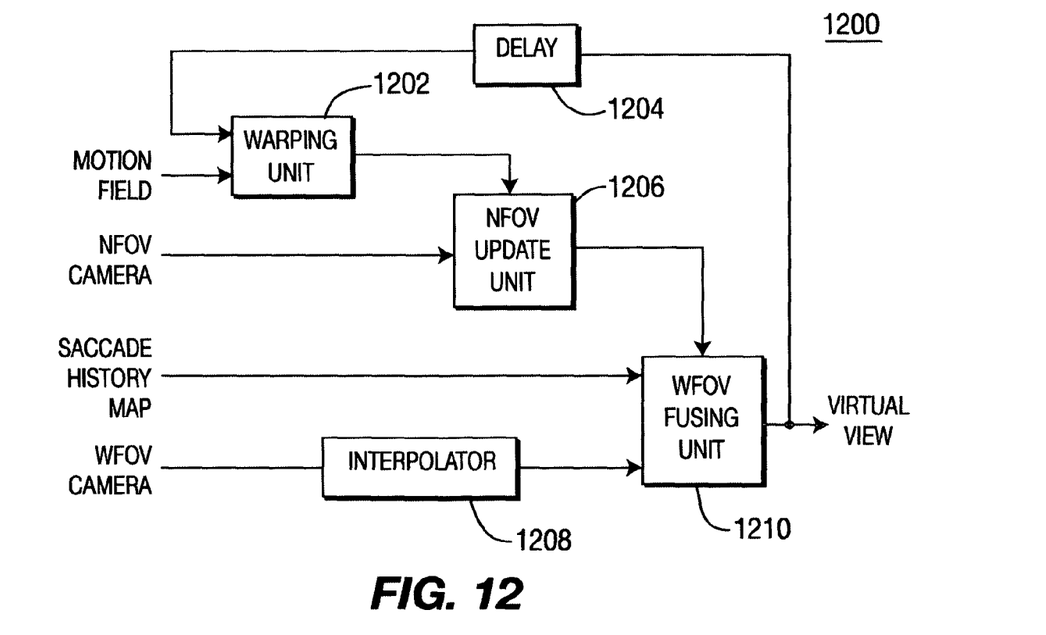
FIG. 12 depicts a block diagram of a virtual view generation module.

FIG. 12 depicts a block diagram of the virtual view generation module 1200. This module 1200 updates the virtual view of the previous time instance with both the WFOV and the NFOV inputs. The module comprises a warping unit 1202, a delay 1204, an NFOV update unit 1206, an interpolator 1208, and a WFOV fusing unit 1210. The warping unit 1202 warps the virtual view 216 generated for last time instance (from delay 1204) to the current time instance using the motion field computed by the Saccade motion planning module 214 (discussed below). Then, the NFOV update unit 1206 overlays the current video frame from the NFOV camera onto the warped virtual view. Finally, guided by the Saccade History Map, the video frame from the WFOV camera is first interpolated to and then fused with the updated virtual view using the interpolator 1208 and the WFOV fusing unit 1210. In one embodiment of the invention, the fusion is performed as follows. From the Saccade History Map, the fusing unit 1210 identifies those pixel locations with a re-sampling period of zero. Those pixels either have never been updated by the NFOV imagery or have been updated a long time ago. The unit 1210 sets the colors of those pixels with zero re-sampling period using the interpolated WFOV camera output and the rest of pixels are set with the warped virtual view updated by the NFOV camera output. In this manner, the imagery from the WFOV camera is updated with the high-resolution NFOV imagery.

Figure 3:
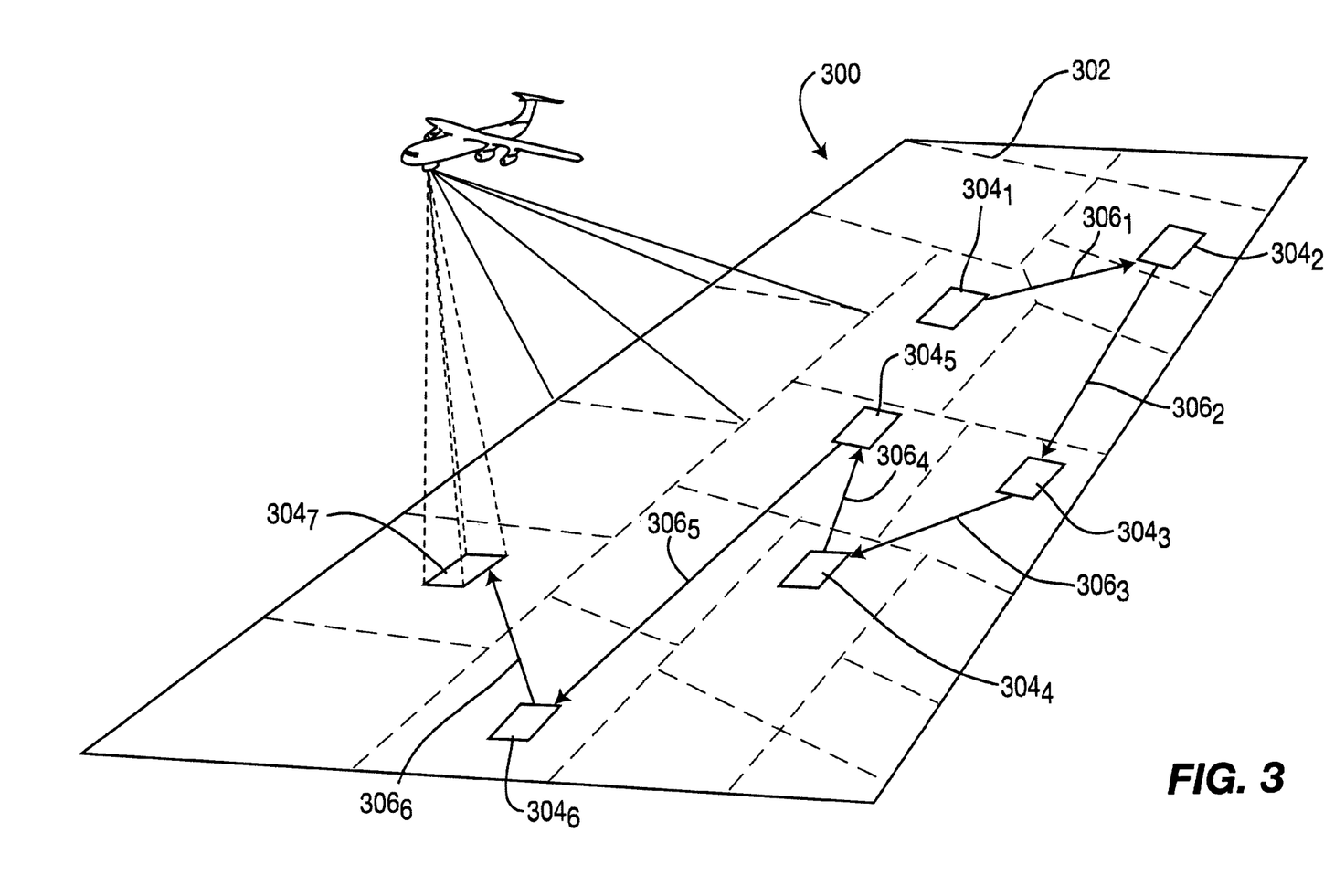
FIG. 3 depicts a multi-layer, multi-resolution mosaic that is created by one embodiment of the present invention.

FIG. 3 depicts a multi-layer, multi-resolution mosaic (MLMRM) 300 that is created by the processes performed in the registration module 202 and the virtual view database and generation module 204. This mosaic 303 forms an input to the virtual view database. The WFOV camera 110 is used to from a first mosaic layer 302 that covers the surveillance area. The local updates or the fixations of the NFOV camera 112 are shown as squares $304_{1-7}$. The way the NFOV camera 112 moves, the Saccade motion, is shown by arrows $306_{1-6}$. By combining fast local updates of squares 304 with the lower resolution mosaic 302, the MLMRM is updated at a normal frame rate, e.g., 30 frames per second. The Saccade motion (i.e., where the NFOV camera 112 is to point next) is computed from previously acquired imagery or other available information and it enables a non-uniform spatial and temporal sampling depending on the scene, targets and underlying tasks.

From the user's point of view the principal interaction with the system is with a GUI (virtual camera control 222) that interfaces with the database 204. The user sees the entire surveillance area as a mosaic 302 and is able to pan and zoom into specific areas of interest. While this imagery is shown to the user, the Saccade motion is occurring without the user having any knowledge of such motion. As shall be described below, if at one of the fixation points (squares 304) a relevant object is detected, the user may be given an alert such that the user can pan and zoom to that location. However, if an alert is not generated, the fixation point imagery is added to the mosaic 302.

Current systems have the user in direct control of the sensor system. Using present invention, the user or operator has indirect control through the virtual view. This aspect of the invention frees the users to focus only on their problem—intelligence gathering—and not be distracted by system operation. The system 200 must provide the user with the information that the user needs to complete the task. This is accomplished by automatically estimating user intent using a Hidden Markov Model (HMM) 224 within the intent estimation module 212.

Using the HMM approach, the user's intent is estimated by their interaction with the Virtual-View Database 204 (i.e., how the virtual view is explored using a virtual camera 208). As the user changes behavior from task to task (e.g., tracking objects to site monitoring), the HMM 224 detects the change in operator actions. When combined with the type of image information the user is viewing, (identified by a feature extraction processor within the intent estimation module 212) that user's intent can be identified.

The intent is used to bias ongoing and future sensor collection (using the Saccade motion planner 214) to be certain that the user's current task can be accomplished while simultaneously using the otherwise unused collection capabilities of the sensor to collect additional intelligence information.

The Saccade motion planner 214 controls the camera 112, dwell times, zoom levels, sweep times, and point of gaze. This is accomplished by analyzing the collected video using a Mixture of Experts approach that takes inputs from five (5) feature detectors (i.e., moving object, change, man-made object, region segmentation, and anomaly). The results of the potential target analysis are then combined with the output from the user Intent Estimation module 212 and the UAV's Flight Mission Planner. In addition, User Priority (for multi-user applications) and optional user inputs, such as user-defined region of interest or user-selected mission objective can also be combined to produce complete control over the camera's motion.

Although a feature of the system 200 is that it operates in a fully automated mode, the system 200 allows both high level operator control and direct operator control using the "optional user input" when an operator chooses to do so.

With the expanded coverage area of the system 200, the user has to be able to identify and monitor many more possible targets. This leads to user overload where targets may be overlooked and significant intelligence opportunities missed. Because of the types of processing already taking place in the system 200 there is an opportunity to add an info-push/alert generation module 210 to the system 200. This capability looks for possible targets or changes in behavior and notifies the user that there is a possible intelligence opportunity developing. The info-push/alert generation module 210 is based on analyzing the behavior of possible targets and comparing that behavior to an ontology of the target behavior. When combined with object and event detection, the info-push/alert generation module 210 significantly enhances the performance of the user.

The intent estimation module 212 is based on analyzing interactions between a user and the system 200. The interactions include how the user manipulates the virtual camera 208 to exploit the virtual view, and how the user responds to alerts 218 sent by the system 200. Since the interaction with the system 200 is the only way for the user to accomplish an exploration task, how the virtual camera 208 is used and how the alerts are treated reflect user intent and the underlying exploration task. Using this approach, reliable user intent estimation is produced.

Figure 4:
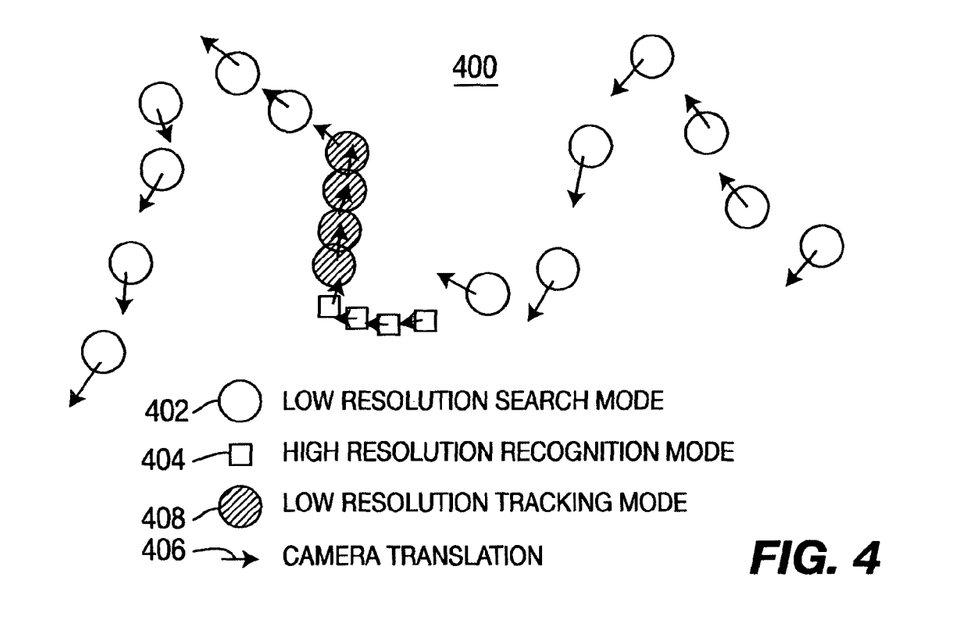
FIG. 4 depicts an illustration of the correlation between camera motions and underlying exploration tasks that is exploited by one embodiment of the present invention.

FIG. 4 depicts an illustration 400 of the correlation between camera motions and underlying exploration tasks that is exploited by the intent estimation module 212. The large ellipsis represents a low-resolution WFOV camera view. The small square 404 represents a high-resolution NFOV camera view when the camera zooms in on an object. The arrow 406 and its length indicate the direction and speed of the camera translation, respectively. The ellipses 402 are an example of a search scenario. When a target is found, the camera is zoomed in on the object. This identification and recognition task is represented by the small squares 404. After the target is identified, it is tracked at low resolution as represented by the hatched ellipses 408. After tracking finishes, search mode is resumed.

For example, when the camera is zoomed in on an object, it shows that the operator wants to see more of the object's detail. Therefore, it is likely that the exploration task is object identification and recognition. Similarly, when the camera is moving in a very predictable manner and covering a large space, the exploration task is likely to be a search. If the camera motion is similar to the object's motion, then the task is tracking. If the camera is fixed in the same area for a long time, the underlying task is probably site monitoring.

Based on how an operator controls the virtual camera, the system 200 estimates user intent including: (1) the underlying exploration tasks and (2) the level of the user's interest of a region or object. For example, the following four exploration tasks may be used:

Searching—uncover an object or region of interest.

Site monitoring—monitor an area, such as a building, harbor or airport, and reporting changes and movement.

Tracking moving objects—track moving objects to discover their destinations and interactions with other objects.

Identification and recognition—identify and recognize types of object, such as distinguishing between civilian and military vehicles, or recognizing a person.

Figure 5:
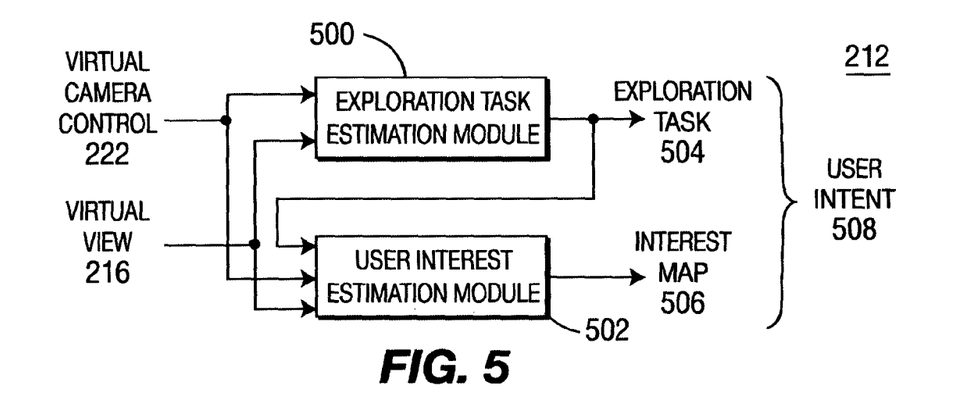
FIG. 5 depicts a block diagram of a user intent estimation module.

FIG. 5 depicts a block diagram of the user intent estimation module 212 comprising an exploration task estimation module 500 and a user interest estimation module 502. Using virtual camera control 222 and virtual view 216 as inputs, the underlying exploration tasks 504 and an interest map 506 are generated as the user intent 508.

When alerts are proactively routed to users based on their interests, the users can respond to these alerts by judging their relevance, e.g., choose a level of relevance to rate each alert. For some alerts, a user may use the virtual camera for more investigation. A user's relevancy rating of alerts routed to him/her is a good cue for intent estimation.

After exploration tasks 504 are estimated, a system can allocate its resources differently for different exploration tasks. For example, shape information is important for identifying an object, but not for site monitoring. In the latter case, information about changes occurring in a site is more important. Therefore, different Saccade motion planning algorithms can be used for different underlying exploration tasks.

Figure 6:
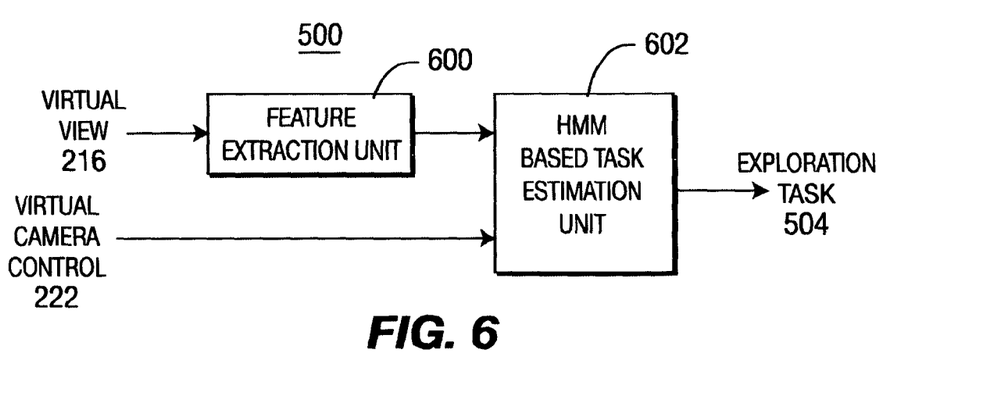
FIG. 6 depicts a block diagram of an exploration task estimation module.

FIG. 6 depicts a block diagram of the exploration task estimation module 500 comprising a feature extraction unit 600 followed by a stochastic estimation unit 602 based on a Hidden Markov Model (HMM). The feature extraction takes the virtual view 216 as input and outputs features that are used by the HMM-based task estimation unit 602. The features used by the HMM-based task estimation unit 602 include segmented regions, moving objects, and their motions. The HMM-based task estimation unit 602 outputs the most likely exploration task 504 and its certainty.

Figure 7:
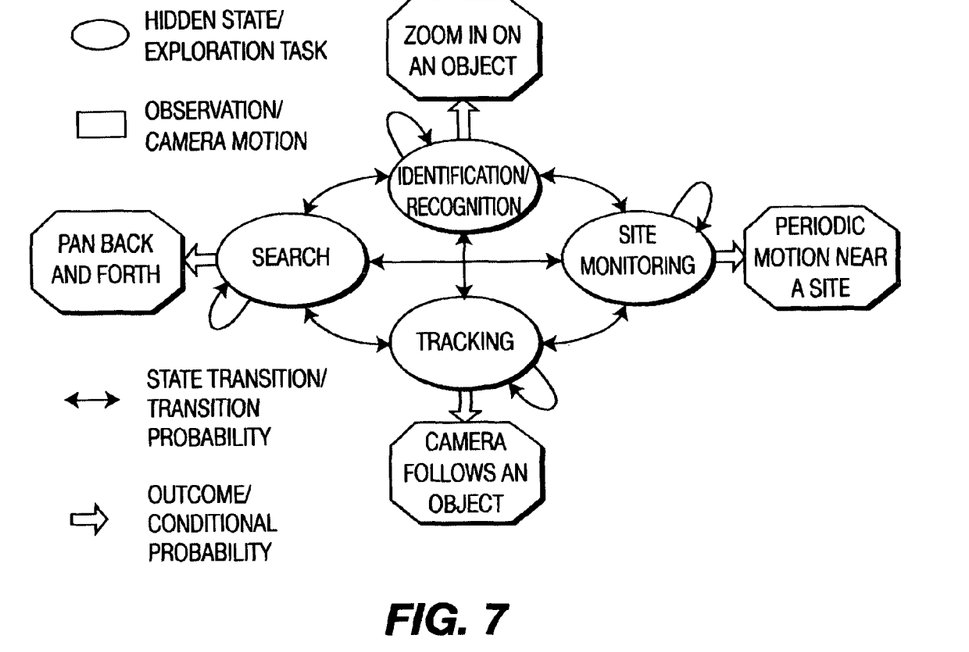
FIG. 7 depicts a relationship diagram for a model of a UAV video capturing process using a Hidden Markov Model.

FIG. 7 depicts a relationship diagram 700 for a model of the UAV video capturing process using the Hidden Markov Model (HMM). In the HMM, the four exploration tasks are the hidden states to be estimated. The observation for each hidden state is the camera motion. State transitions are characterized by state transition probability mass functions. The relationship between the exploration task and the camera motion is represented using a conditional probability density function.

To estimate the exploration tasks, the system 200 models the virtual camera control used for exploring the virtual view using a Hidden Markov Model (HMM). HMM is an effective tool for estimating hidden states of a partially observable stochastic process. It is the most successful model for speech processing, and has been applied to many areas including biological sequencing, video scene segmentation, and network intrusion detection. For this application, HMM provides a unifying framework to jointly model the transition among different exploration tasks and the relationship between the exploration tasks and the virtual camera movement.

There are two kinds of states in an HMM: the unobservable states called hidden states and the observable states called observations. In one embodiment of the present invention, each exploration task is represented as a hidden state. The transitions among the hidden states are modeled using transition probability mass functions. All exploration tasks occurring in a mission are modeled using a Markov Chain. It assumes that given the current exploration task, the future tasks are independent from past tasks. The features extracted from the virtual view and the virtual camera controls are the observations in the exploration task model. The relationship between an exploration task and the features extracted at the same time instant are represented using a conditional probability density function.

With this model, the exploration task classification problem is transformed into an estimation problem. That is, given a set of observations, the algorithm estimates the hidden state corresponding to each observation. Therefore, the inputs to the HMM-based task estimation are the virtual camera control and features extracted from the virtual view. The outputs are the hidden states—exploration tasks associated with the corresponding observations. The parameters are the transition probability mass function and the conditional probability density functions.

Let $T_t$ be the exploration task and $F_t$ be the virtual camera control and the corresponding video features extracted at time t. $T_t$ is set to one of four exploration task indices. They are 1-search, 2-site monitoring, 3-tracking moving objects and 4-identification and recognition. The transition probability mass function is $P_T(T_t|T_{t-1})$, and the conditional probability density functions are $P_F(F_t|T_t)$. The exploration task estimation is formulated as the MAP (maximal a priori) estimation of the exploration task at time t, $T_t$, given the observations at time t, $F_t$ and the estimated task at time t−1, $\hat{T}_{t-1}$.

$$\hat{T}_t = \arg\max_T P(T|F_t, \hat{T}_{t-1}) = \arg\max_T \frac{P_F(F_t|T) \cdot P_T(T|\hat{T}_{t-1})}{\sum_{T'} P_F(F_t|T') \cdot P_T(T'|\hat{T}_{t-1})} \quad (1)$$

where T and T' are auxiliary variables for maximization and summation, respectively. To solve (1), both the transition probability mass function, $P_t(T_t|T_{t-1})$, and the conditional probability density functions, $P_F(F_t|T_t)$ need to be defined. However, the solution of (1) is noise-sensitive. There are several ways to improve the solution's robustness. The simplest is to simultaneously estimate N consecutive exploration tasks. In one embodiment of the invention, a parametric model for these probability mass/density functions is used.

As discussed before, the most important feature for exploration task estimation is the virtual camera control, including pan, tilt, and zoom control parameters. Other features used are objects and their motion trajectories, because the correlation between an object's motion trajectory and the camera motion trajectory can be used to distinguish tracking from search and monitoring.

Besides the exploration task, the system 200 estimates the user's interest in each object or region. The user's interest level in each object can greatly help the system 200 filter all objects a user has not seen. Objects similar to those in which a user is interested become alerts to the user; objects similar to those in which a user is not interested are filtered out to reduce the user's workload.

Figure 8:
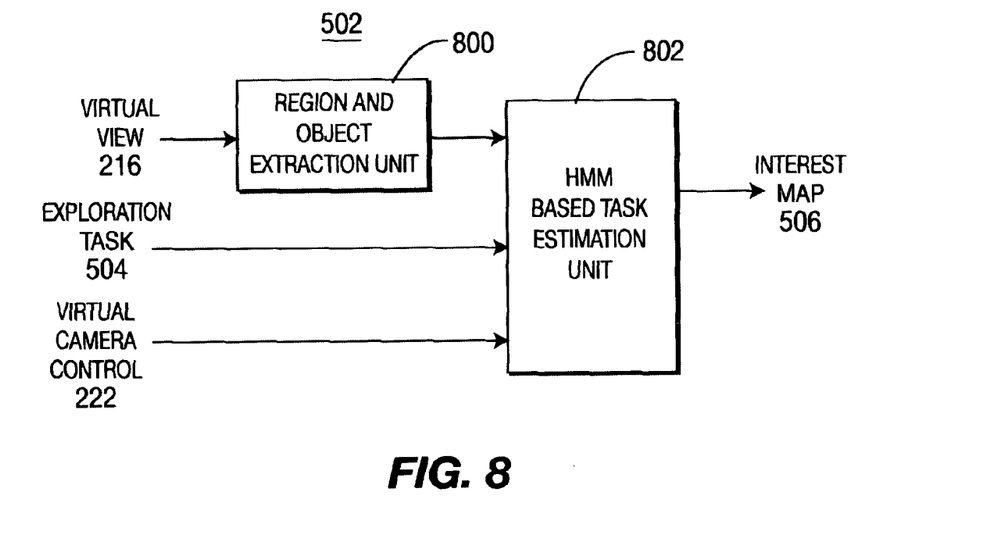
FIG. 8 depicts a block diagram of a user interest estimation module.

FIG. 8 depicts a block diagram of the user interest estimation module 502. The inputs of this module are the virtual view 216, exploration task 504 and the virtual camera control 222. The output of this module 502 is an interest map 504 measuring the user's interest at each pixel location.

To measure the user's interest, regions and objects are first extracted from the virtual view 216. In this approach, the system 200 does not distinguish regions and stationary objects. The system 200 measures the user's interest in a region or object by the amount of attention the user pays to that object. Given the spatial resolution of the user interest map 506, the user's attention to an object is measured by the number of pixels over time the user uses to view the object. Let I(i,t) be the user's interest of the i-th object at time t:

$$I(i, t) = \sum_{l=0}^{t} \sum_{u,v} e(i, u, v, l) \cdot s(u, v, l) / N(i) \quad (2)$$

where e(u,v,l) is an indicator function. It is 1, if the pixel (u,v) in the virtual view 216 belongs to the i-th object and is visible to the user through the virtual camera 208 at time l; s(u,v,l) is a scale factor determined by the exploration task, where the pixel on the screen, and location of the pixel with respect to the behavior of the virtual camera 208 at time l and N(i) is the number of pixels of the i-th object at the spatial resolution of the user interest map 506. In equation (2), s(u,v,l) is the most important term. It can be positive or negative. First, it is related to exploration tasks 504. Within the four exploration tasks, the highest scale factor is assigned to identification and recognition, followed by the scale factor for tracking and site monitoring. The lowest scale factor is assigned to searching. s(u,v,l) also varies according to the relative position of the pixel on the screen. Generally, a pixel in the center of the screen has a higher scale factor than a pixel on its border. Finally, s(u,v,l) can vary depending on the pixel location and the history of the virtual camera control. If the virtual camera pans to the left for awhile and then turns back to pan to the right, it shows that the user may be convinced there is nothing of interest on the left and has turned back to the right.

The I(i,t) is a good measure of the amount of attention that a user gives to an object. For example, the longer a user watches an object, the higher measure of the user's interest on that object. Given the time a user spends on examining an object, if he zooms in on the object, the total number of pixels used to display the object increases, so does the measure of the user's interest.

In order to accomplish a mission, the camera operator needs to first understand the captured video and then extract information important to the mission. According to different video content and different objectives, the camera is operated in different modes:

Fixation: the camera Field Of View (FOV) is continuously fixated on the same object or area. Fixation shows the operator's interested in the object. This mode is often used to identify (ID) or monitor an object or a region.

Tracking: fixation on a moving object.

Panning: monitoring a large object that cannot be contained in the FOV at the desired resolution or searching for an object of interest.

Zoom-in: gathering more details for an object or a region of interest.

Zoom-out: increase the coverage of the camera by reducing the spatial resolution. This is generally used after object ID is completed or the operator loses the context of the environment.

For different modes, the operator's ROI are different. When the camera is fixated on an object, the object is often placed in the middle of the FOV. When the camera is panning, an operator is more interested in objects extended in the direction of panning and is less interested in objects perpendicular to the direction of panning.

By analyzing the relationship between the ROI and the operator's behavior, an ROI model can be generated at the frame level. The frame level ROI is integrated into a sequence level Importance Map (IM) measuring the relative importance of different regions among the area under the surveillance. In an IM, each pixel is given an importance value ranging from the highest level of importance, 1, to the lowest level of importance, 0.

As discussed above, the ROI of an operator is reflected in the way the camera is used, in particular the movement of the camera FOV. When the camera is fixated on an object, the object is generally in the center of the ROI. When the camera is panning, the region parallel to the direction of the camera movement is more important than the rest of the FOV.

Figure 14:
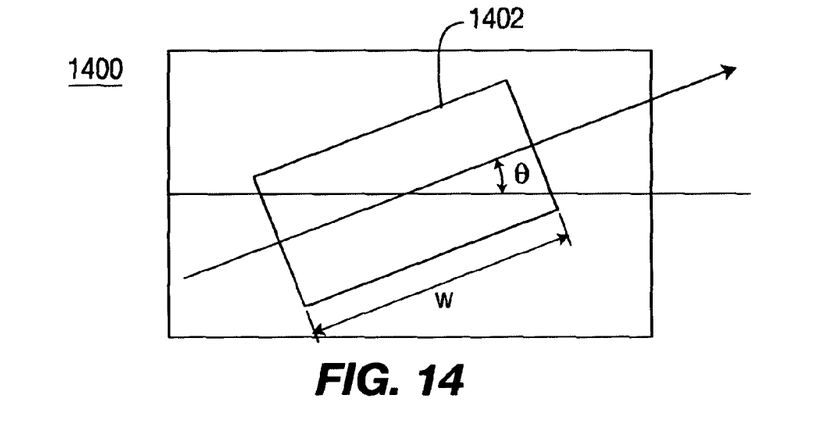
FIG. 14 depicts a frame level model for a region of interest.

FIG. 14 depicts a frame-level ROI model 1400. For each video frame, the operator's ROI is modeled as a rectangular region 1402 centered in the middle of the camera FOV, i.e., a rectangular importance map. The size and the direction of an ROI are determined using the velocity of the camera FOV. The height of the frame ROI is fixed and is set, for example, to be half the height of the video frame. The width of the frame ROI, w, is a function of the amplitude of the speed of the FOV, $$v = \sqrt{v_x^2 + v_y^2}$$

$$w = \max(W, (0.5 + 7.5 \cdot v) \cdot W \quad (3)$$

where W is the width of the frame and the unit for v is pixel per second. The angle of the frame-level ROI, θ, is the angle (or direction) at which the camera FOV moves and is calculated using the speed, $v_x$ and $v_y$. The speed, $v_x$ and $v_y$, are computed using global motion estimated from adjacent video frames assuming plane perspective transformation.

The rectangular importance map described above can be further improved by forcing each object in the FOV to have a single importance value. To achieve this, the original video frame is segmented into regions to form a segmentation map. Then, for each connected component extracted from the segmentation map, the importance values are averaged and set to the average value for all the pixels in that connected component. This is referred to as an object-based importance map.

Unlike entertainment video, there is no scene cut or editing of aerial surveillance video. Therefore, even if there is no target or ROI, the camera operator still needs to continue capturing the video in order to find a target or ROI, so ROI estimated for each frame may not have the same importance value to the operator.

In one embodiment of the invention, a sequence-level IM generation algorithm integrates frame-level ROI into a more robust estimation of what is important to the operator. Additionally, the sequence-level IM can estimate the level of interest of the operator toward different regions under the surveillance.

To compute the sequence level IM, we assume that the importance of a pixel is proportional to the amount of attention that the pixel received from the operator. Let I(x,y) be the importance at pixel location (x,y), then $$I(x, y) = \sum_t A(x, y; t) \quad (4)$$

where A(x,y;t) is the attention received at pixel (x,y) at time t. For the frame at time t, it is assumed that A(x,y;t)=1, if (x,y) is within the ROI estimated for frame t using the method proposed above and A(x,y;t)=0, if (x,y) is outside the ROI of frame t.

Therefore, if we assign an importance value of 1 to the ROI estimated for each frame and an importance value of 0 to the area outside the ROI, the sequence level IM can be computed by integrating the frame level ROIs using the standard video mosaicing techniques.

The information collection capability of the system 200 is determined by how the Saccade motion is planned. With good Saccade motion planning, fewer resources (fewer number of systems) can be use to collect more mission critical intelligence. With poor Saccade motion planning, resources are wasted on information of no importance.

Figure 9:
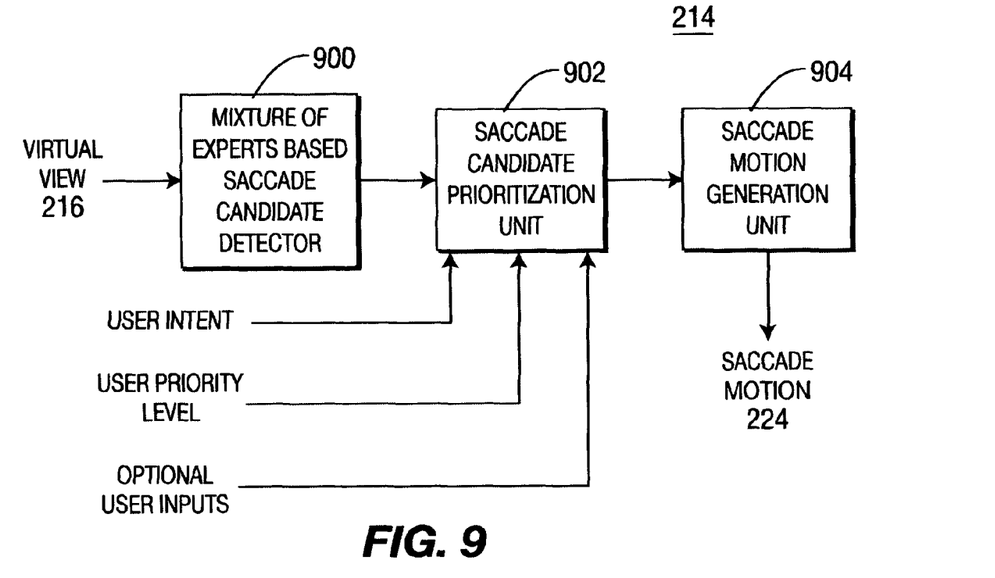
FIG. 9 depicts a block diagram of a Saccade motion planner.

FIG. 9 depicts a block diagram of the Saccade motion planner 214 comprising a mixture of experts based Saccade Candidate detector 900, a Saccade candidate prioritization unit 902 and a Saccade motion generation unit 904.

The Saccade motion planner 214 first generates a Saccade candidate list from the virtual view 216 using a Mixture-of-Experts (MoE) based Saccade location detector 900. The Saccade candidate list is a list of locations that needs to be updated, i.e., imaged by the NFOV camera.

The components of the Saccade candidate list are then prioritized using the characteristics of each component, user intent, user priority (for multi-user applications) and optional user inputs, such as user-defined region of interest or user-selected mission objective.

Finally, Saccade motion 224 is computed from the prioritized Saccade candidate list. During the Saccade motion generation, FOV of the NFOV camera and the movement of the UAV are considered to compensate for the movement occurring during the movement of the FOV of the NFOV camera.

Figure 10:
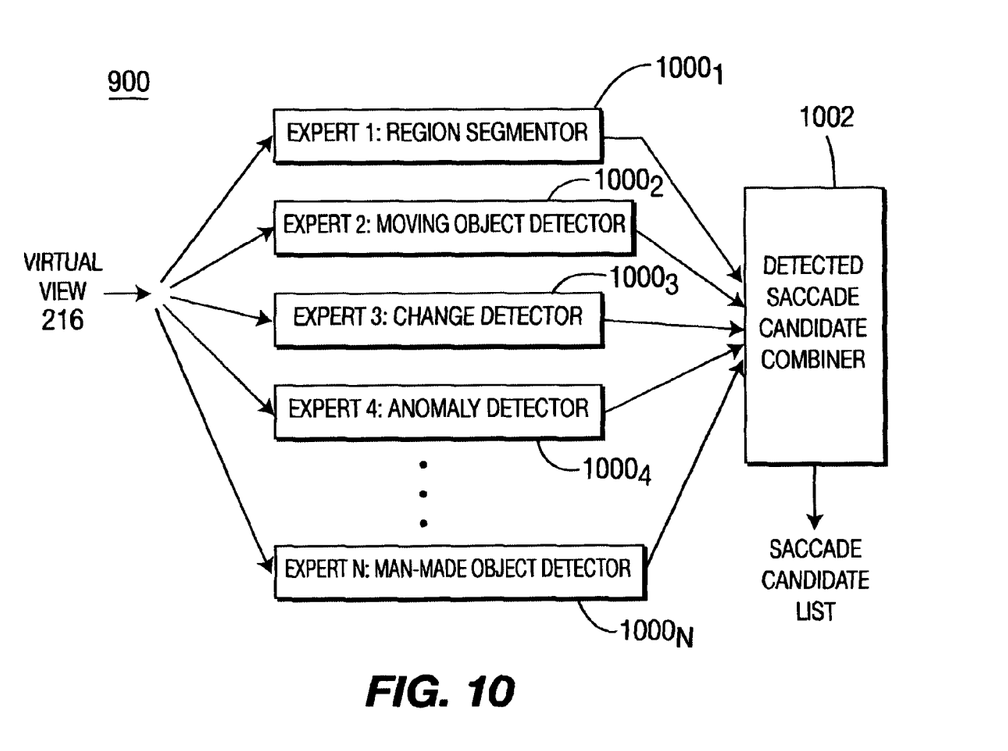
FIG. 10 depicts a block diagram of a mixture of experts based Saccade candidate detector.

FIG. 10 depicts a block diagram of mixture of experts based Saccade candidate detector. It consists of a set of detectors, each of which specializes in detecting a particular thing, such as anomaly, man-made object, etc. The results of the experts are combined into a list of Saccade candidates.

A Mixture of Experts (MoE) based Saccade location detector 900 is used to extract a Saccade candidate list. MoE is a way to design complex estimation and detection systems. In a MoE system, several classifiers or detectors $1000_1$ through $1000_N$ run simultaneously. The detection results of all experts are combined using a detected Saccade candidate combiner 1002 to give the final detection results. The Saccade candidates can be classified into different categories, such as moving objects or man-made objects. Thus, it is natural to train a number of detectors, each for one category. Then, the detection results that define the characteristics of a spatial location are combined. Compared to non-MoE systems, MoE systems are easier to design, and their final decisions are easier to interpret.

In one embodiment of the invention, the following five experts for Saccade candidate detection are used:

A moving object detector $1000_2$ that detects moving objects and estimates their motion and shape. The detector will use multi-frame global motion compensation to detect, extract and verify moving objects. After moving objects are extracted, they are further analyzed to determine their motion trajectories and shapes.

A change detector $1000_3$ that detects changes in the virtual view 216 that do not correspond to moving objects, but are significant enough for a reacquisition. This is especially useful for assessing weapon effectiveness.

A man-made object detector $1000_N$ that is trained to separate man-made objects from natural objects. For example, it separates trees from buildings, waves from ships. However, if a man-made object is well-camouflaged, it will not be detected by the man-made object detector. Instead, the anomaly detector $1000_4$, discussed below, may detect such an object. The man-made object detector $1000_N$ is based on a well-known multi-scale image segmentation algorithm developed for texture classification. This algorithm is trainable.

An anomaly detector $1000_4$ for detecting objects that are different from their surroundings. For example, this detector attempts to separate tanks from fields, ships from ocean, and aircrafts from airports. The detector uses a multi-scale autoregressive model that is generally used for anomaly detection-based target identification.

A region segmentor $1000_1$ that performs unsupervised segmentation is used to partition a video frame into non-overlapping regions and characterize each region. The segmentor determines whether or not a region contains high spatial details. Region segmentation is used to assist and validate the detection from the above three detectors. The detector uses a model-based multi-scale unsupervised image segmentation algorithm.

The results of the above five expert detectors are combined to identify a set of Saccade candidate locations and the characteristics of each. For example, a single expert can identify a candidate location as a moving object or a man-made object. A candidate location can also be a man-made, moving object with high spatial details. In the latter case, responses from two experts are positive at the location, and the location contains substantial high frequency information.

A default priority strategy is used to define the priority level of a Saccade candidate location. For example, a moving object has a higher priority than a region with only spatial details. A moving man-made object has a higher priority than a stationary man-made object. In addition, the priority is also related to the previous Saccade motion. If a stationary man-made object has been imaged before as indicated by the previous Saccade motion, then it is set to the lowest priority.

However, when there is knowledge about the user intent, the default priority strategy will be adapted to achieve what a user wants to accomplish. The user intent can be specifically input by a user by high-level command, such as selecting a moving object as his interest. Or the user intent can be derived from the interaction between the user and the system using the approach discussed with respect to the intent estimation module. For example, if the user intent is to monitor sudden change, the priority level of a moving object is lowered and the priority level of locations that detected by change detector, but not by the moving object detector, are increased. When multiple users task the system at the same time, the priority level of that user will scale the level of bias used to modify the prioritization process for a user's intent.

In one embodiment of the system 200, two types of alerts are generated for the user: (1) reactive alert and (2) predicative alert. Reactive alerts state what has happened and predicative alerts hypothesize what may happen in the future.

Figure 11:
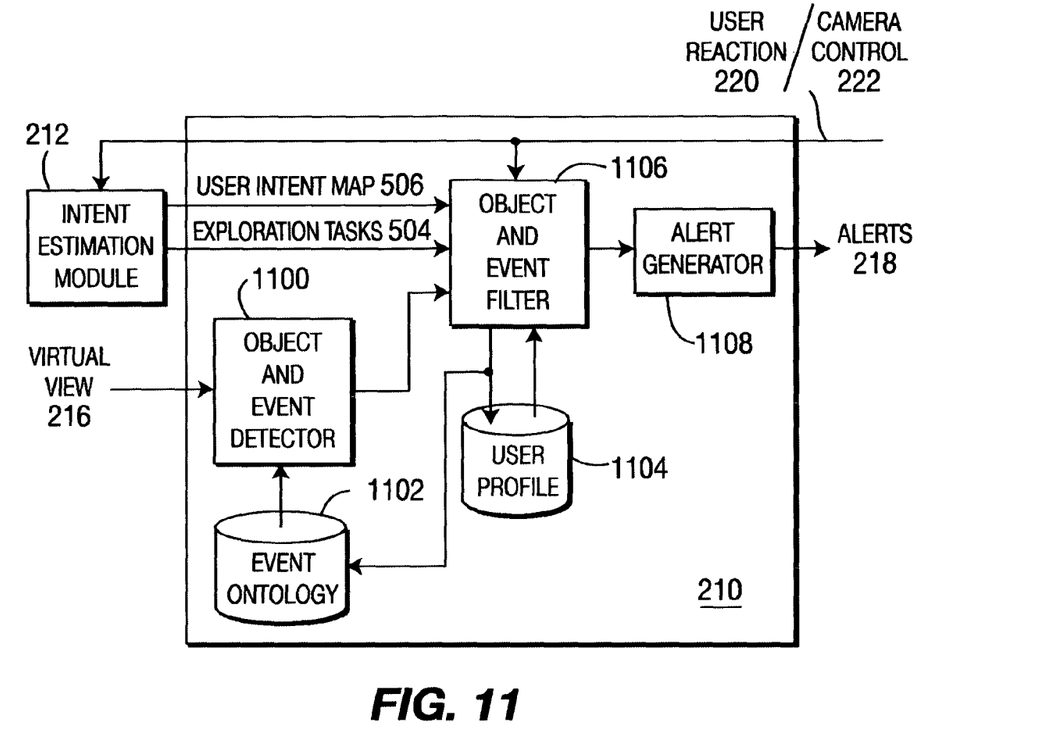
FIG. 11 depicts a block diagram of an info-push and alert generation module.

FIG. 11 depicts a block diagram of the info-push and alert generation module 210. The inputs to the info-push & alert generation module are the virtual view 216, user's response to alerts 220, virtual camera control 222 and the estimated user intent 508 in the forms of estimated exploration tasks 504 and user interest map 506. The output is the alert 218 generated for the user. The info-push and alert generation module 210 comprises an object/event detector 1100, an event ontology database 1102, a user profile database 1104, an object and event filter 1106 and an alert generator 1108.

The object/event detector 1100 extracts general objects and events from the virtual 216 view. Objects are generally physical entities, e.g., people, trucks, tanks, bridges, fields, or trees. The state change of an object and the interaction of a group of objects are events. Some sample events are: a tank going from not being observed to being found; a truck loading or unloading equipment; a building destroyed by a missile. The objects and simple events are extracted using a similar Mixture-of-Experts (MoE) approach discussed above. In addition to the MoE-based object and simple event extraction, complex events formed by spatially and temporally correlated simple events are extracted using event ontology. For example, "an enemy tank is moving towards north" is a simple event; "enemy tanks are trying to surround a friendly convey" is a complex event. Using event ontology, events from simple to complex, will be organized in a hierarchical way to facilitate an efficient and effective event extraction.

The event ontology database 1102 stores the event ontology. Depending on the mission and the user's intent, different sets of ontology can be selected. For example, aerial surveillance over mountainous area and aerial surveillance over water will require different ontologies because of the different type of application events.

The object and event filter 1106 prioritizes objects and events extracted from the virtual view 216. The basic idea here is to find objects and events in which a user has shown interest, and to filter out objects and events in which that user has no interest. From the computed user interest map 506, regions or objects have very low interest value are removed by the filter. These include those regions or objects that have never been visited by the user, but are similar to those that have been visited by a user and elicited no interest. Previous video summarization approaches generally rely on key frame analysis, and aim at finding the key frames in which a user is interested, not the object or the event of interest. The idea of identifying what a user is not interested in from how he controls the virtual camera and use it to filter the video in order to find what a user is interested in is both novel and effective. Surveillance videos contain many more objects of no interest than objects of interest. By filtering out objects and regions of no interest, we are able to analyze those objects and regions may be of interest with much more resources.

Additionally, using estimated exploration tasks 504, the system 200 can further filter out unwanted objects and events. For example, if the current exploration task 504 is estimated as site monitoring and the user's interest map 506 shows that the user is highly interested in a man-made object, e.g. a building, the change related to the man-made object, such as arrival of a car, will be sent to the user as an alert. However, similar houses down the road will be filtered out. On the other hand, if the underlying task is search and a user shows interest to a man-made object, similar man-made objects will be alerted to the user.

Information related to a user will be stored in user profile database 1104. This information can be as general as his job function and as specific as the objects that he is interested in the last minute, last hour or yesterday. This information is used for prioritizing the objects and events.

After filtering out objects and regions of no interest, the remainder is prioritized according to the current exploration task 504, user's interest map 506, threat level of the detected events, and the user's response to similar objects or events.

The user profile database 1104 contains information about a user's job function, objects or events that he is interested in and monitored according to the characteristics of these objects and events. The user's response to all alerts is also noted.

The alert generator 1108 creates alerts from the prioritized object and event list, where alert(s) are generated according to what the user is working on, the relationships of the objects and events, and the characteristics of the objects and events. For example, if the user is busy tracking a target and direct attack on the target, alerts about finding similar targets will be delayed and alerts about incoming objects will be given to avoid collateral damage.

A plurality of systems 200 may be interconnected to expand the capability of single system. Instead of generating a virtual view for one system, a single virtual view can be generated by combining the inputs of all systems. All systems share the estimated user intent. There is a single prioritized Saccade candidate location list. This list is further biased by the location of each individual system to plan the Saccade motion for an individual system. However, flight path planning also must be considered together with the Saccade motion planning.

Multi-Sensor Collaboration can be used to expand the capability of the system from single-type sensors to multiple-type sensors. From the multi-sensor collaboration point of view, the system is a two-sensor collaboration system fusing spatial information-rich NFOV camera outputs with temporal information-rich WFOV camera outputs. Therefore, the same framework can be used for other types of sensor fusing or multi-sensor collaboration. However, since there is a straight-forward relationship among the NFOV and WFOV camera outputs, precise registration of the two sensor outputs are available. Thus, instead of precise registration of sensor outputs, the system 200 may use a behavior-based sensor collaboration technique.

For example, instead of direct NFOV using WFOV, a UAV with a moving target indicator (MTI) can be used to direct NFOV image capture. In this case, when MTI detects a moving target, a UAV equipped with EO will approach the area and image the target. The motion signature of the target will be used for registration. In another case, when a UAV with EO camera suspect enemy vehicles hiding under the tree, another UAV with laser radar (LADAR) can image the same area to uncover hiding enemy vehicles, and registration similar to geo-registration can be used to determine the correspondence of the EO and LADAR images. Multiple-sensor collaboration maximizes the precision of target ID and minimizes the total resources needed for Precision ID and Persistent Surveillance.

Multi-user collaboration expands the capability of system from serving a single user to serving a large number of users with different needs. The system can not only acquire vast amount of information for different needs of different users, but also can intelligent route information to different users according to their needs. Moreover, providing proactive alerts through information-push, the system will also play multiple roles from "a server" to "a coordinator." The system can task analysts to improve efficiency and to avoid redundant efforts. By routing alerts according analyst's workload, expertise and interest, information can flow through the command and control infrastructure more easily and more quickly. Therefore, reduce response time and improve efficiency. For example, if one analyst is busy with a task, the system can send the alert with the highest priority to an idle analyst. Also, after the system knows an analyst is searching through an area. The system can pre-filter the area with what the analyst already saw but in which he had no interest. Then, the analyst is given a list of possible targets, instead of letting him/her waste time browsing through a large area.

While the foregoing is directed to embodiments of the present invention, other and further embodiments of the invention may be devised without departing from the basic scope thereof, and the scope thereof is determined by the claims that follow.

The invention claimed is:

1. A computer implemented method of performing adaptive image acquisition comprising:
    capturing images from at least one sensor, where the at least one sensor produces a higher resolution image and a lower resolution image; and
    using at least one microprocessor for:
    registering the images from the at least one sensor;
    creating a virtual view of a scene imaged by the at least one imaging sensor using the registered images; and
    enabling a user to indirectly control the at least one imaging sensor while viewing the virtual view.

2. The method of claim 1 wherein the at least one sensor comprises:
    at least one first sensor comprising a narrow field of view camera for producing a higher resolution image and the at least one second sensor comprising a wide field of view camera for producing lower resolution images.

3. The method of claim 2 further comprising moving the at least one first sensor using Saccade motion.

4. The method of claim 3 wherein said creating step further comprises overlaying images from the higher resolution first sensor over an image mosaic of images captured by the second sensor.

5. The method of claim 1 further comprising deriving a user's intent from a user's control of the cognitive interface and using the user's intent to control motion of the at least one sensor.

6. The method of claim 5 wherein the deriving step further comprises estimating an exploration task being performed.

7. The method of claim 6 wherein the deriving step further comprises using a hidden Markov model to estimate the exploration task.

8. The method of claim 5 wherein the deriving step further comprises creating an interest map of a user's interest in specific regions and/or objects that have been imaged.

* * * * *